United States Patent [19]
Kondo et al.

[11] Patent Number: 5,277,168
[45] Date of Patent: Jan. 11, 1994

[54] FUEL OUTFLOW PREVENTING APPARATUS OF FUEL TANK FOR VEHICLE

[75] Inventors: Seiji Kondo, Chiryu; Kazusato Kasuya, Kariya; Yoshihiro Kato, Seto, all of Japan

[73] Assignee: Aisan Kogyo Kabushiki Kaisha, Ohbu, Japan

[21] Appl. No.: 29,577

[22] Filed: Mar. 11, 1993

[30] Foreign Application Priority Data

Mar. 12, 1992 [JP] Japan ................. 4-053675

[51] Int. Cl.⁵ ............... F02M 33/02; G05B 11/01
[52] U.S. Cl. .................. 123/519; 123/198 D; 137/43
[58] Field of Search ........... 123/520, 521, 518, 519, 123/516, 514, 509, 198 D; 137/38, 39, 43

[56] References Cited

U.S. PATENT DOCUMENTS

| | | |
|---|---|---|
| 4,331,120 | 5/1982 | Hiramatu et al. . |
| 4,448,594 | 5/1984 | Kozawa . |
| 4,507,132 | 3/1985 | Yoshida . |
| 4,646,701 | 3/1987 | Fukumoto ............. 123/519 |
| 4,658,796 | 4/1987 | Yoshida et al. . |
| 4,702,216 | 10/1987 | Haruta et al. . |
| 4,836,172 | 6/1989 | Haruta et al. . |
| 4,860,715 | 8/1989 | Hiraku ................. 123/519 |
| 4,869,283 | 9/1989 | Oeffling ............... 123/43 |
| 4,869,739 | 9/1989 | Kanome et al. . |
| 4,887,578 | 12/1989 | Woodcock ............. 23/520 |
| 4,991,615 | 2/1991 | Szlaga ................. 123/43 |
| 5,036,823 | 8/1991 | MacKinnon ............ 123/520 |
| 5,054,508 | 10/1991 | Benjey ................. 123/43 |
| 5,056,493 | 10/1991 | Holzer ................. 123/520 |
| 5,056,494 | 10/1991 | Kayanuma .............. 123/519 |
| 5,123,459 | 6/1992 | Toshihiro .............. 123/520 |
| 5,193,511 | 3/1993 | Fujino ................. 123/520 |
| 5,207,808 | 5/1993 | Haruta et al. . |

FOREIGN PATENT DOCUMENTS

| | | |
|---|---|---|
| 61-132763 | 6/1961 | Japan . |
| 61-258963 | 11/1961 | Japan . |
| 61-291217 | 12/1961 | Japan . |
| 61-291218 | 12/1986 | Japan . |

*Primary Examiner*—Carl S. Miller
*Attorney, Agent, or Firm*—Cushman, Darby & Cushman

[57] ABSTRACT

A fuel outflow preventing apparatus of a fuel tank for a vehicle has an object to prevent fuel outflow from the fuel tank when the vehicle is inclined or turned over. Therefore, this apparatus comprises a canister, a float valve provided in an air chamber of the fuel tank, which float valve is closed when the level of fuel in the fuel tank is equal to or higher than a predetermined level and when the vehicle is inclined or turned over, a fuel outflow preventing valve provided in an upper portion of the air chamber of the fuel tank, which fuel outflow preventing valve is closed when the vehicle is inclined or turned over, a first evaporation passage for communicating the float valve with the canister, a second evaporation passage for communicating the fuel outflow preventing valve with the canister, and opened/closed valve device provided in the second evaporation passage.

4 Claims, 7 Drawing Sheets

FUEL OUTFLOW PREVENTING APPARATUS OF FUEL TANK FOR VEHICLE

BACKGROUND OF THE INVENTION

1. Industrial Field of the Invention

The present invention relates to a fuel outflow preventing apparatus of a fuel tank for a vehicle.

2. Description of the Prior Art

A conventional evaporated fuel outflow preventing apparatus of a fuel tank for a vehicle is disclosed in Japanese Patent Unexamined Publication No. 61-291218.

Figure 8:
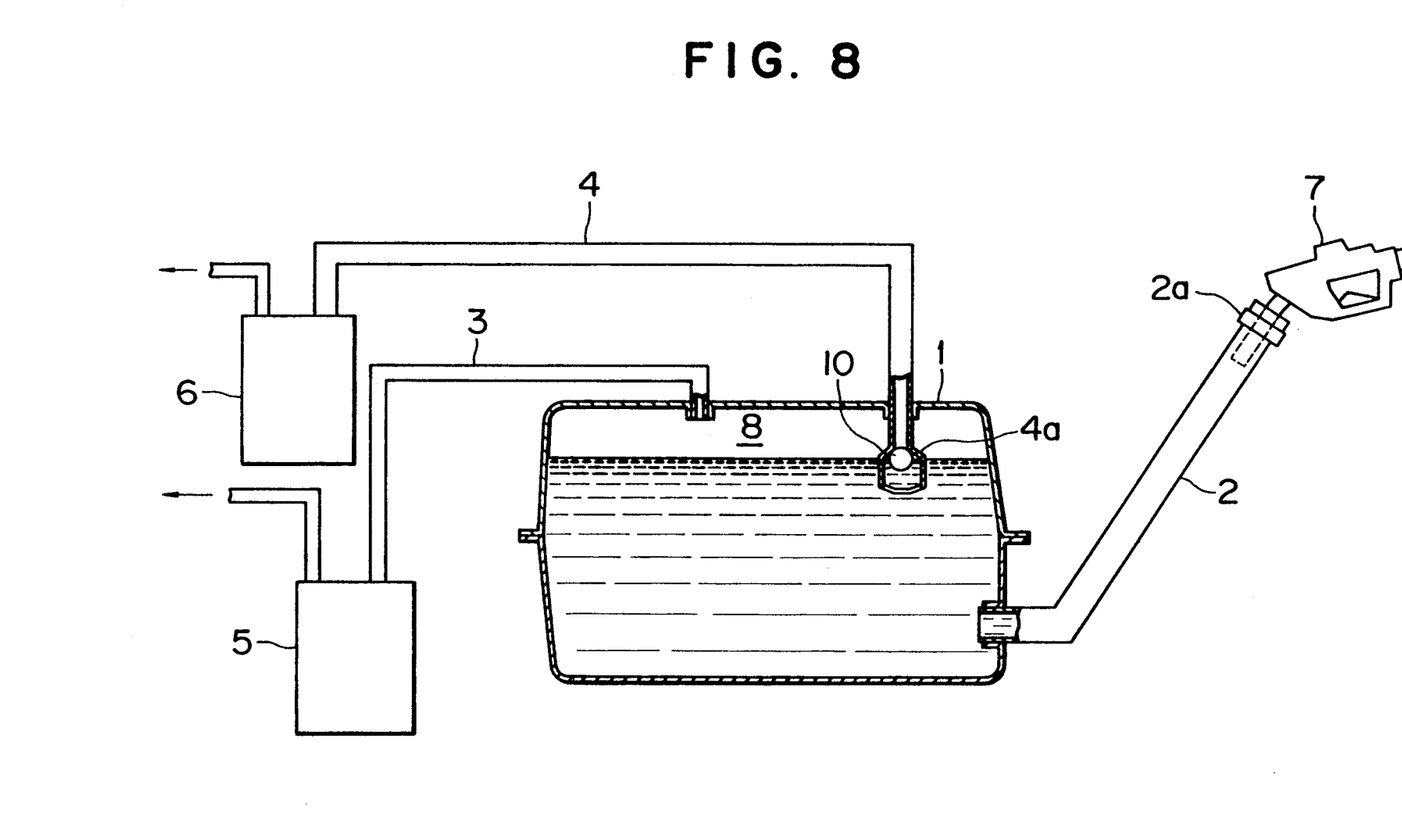
FIG. 8 is a cross-sectional view showing a conventional technique.

In this apparatus, as shown in FIG. 8, the vent tube 4 projectingly provided inside of the tank 1 is connected to the canister 6, so that it communicates with the atmosphere through the canister 6. The float valve 10, which is closed to shut off the vent tube 4 when the fuel in the tank 1 reaches the predetermined level, is installed in the projecting end portion of the vent tube 4 in the tank 1.

As a measure for preventing outflow of evaporated fuel from a filling port 2a of a filler tube 2 at the time of fuel feeding, the periphery of that portion of the filling port 2a where a fuel feeding tank is inserted is sealed with a sealing member (not shown). In such a case, since the vent tube 4 communicates with the atmosphere through the canister 6, an adequate venting function can be obtained from the vent tube 4 so as to carry out fuel feeding smoothly.

During the fuel feeding, the evaporated fuel accumulated in an upper air chamber 8 of the tank 1 is discharged to an evaporation tube 3. In addition, it is discharged through an opening at the bottom of a large-diameter portion 4a of the vent tube 4 and supplied to the canister 6 from the vent tube 4 as well. The evaporated fuel absorbed by either of the canisters 5 and 6 is supplied, with the purge air, to an engine intake system (not shown) where it is processed.

When fuel in the tank 1 reaches a predetermined level, the float valve 10 is closed to prevent the fuel exceeding a predetermined amount from flowing into the tank. Even if the fuel is fed to a level close to a neck portion of the filler tube 2 after preventing the fuel exceeding this predetermined amount flowing in, the fuel will not enter the vent tube 4 because the projecting end portion of the vent tube 4 in the tank 1 is closed by the float valve 10, as described above. Thereafter, the evaporated fuel generated in the upper air chamber 8 of the tank 1 is discharged to the canister 5 via the evaporation tube 3 while the vent tube 4 is closed by the float valve 10. When the fuel level is lowered and the float valve 10 is opened, however, the evaporated fuel is also discharged to the canister 6 via the vent tube 4 and processed in the above-mentioned manner.

In the conventional technique described above, when the vehicle is inclined at a predetermined angle or more, or when it is turned over, the fuel in the tank will flow out to the canisters, to thereby deteriorate absorbents in the canisters. Further, the fuel will leak out of the vehicle through the canisters, so that it will pollute the atmosphere, and that it is dangerous.

Recently, in some regions, the pressure in the upper air chamber of the tank during traveling of the vehicle is restricted to a predetermined value or less. It is necessary to clear this restriction and to restrict the full amount (the full-tank amount) of the fuel by preventing excessive fuel feeding. In the conventional technique, however, it is questionable whether these two necessities are satisfied.

SUMMARY OF THE INVENTION

It is a first object of the present invention to prevent fuel outflow from the fuel tank when the vehicle is inclined or turned over. It is a second object to maintain the pressure in the upper air chamber of the tank body at a predetermined value or less during traveling of the vehicle. Further, it is a third object to restrict the full amount (the full-tank amount) of the fuel during fuel feeding.

In order to achieve the above objects, a fuel outflow preventing apparatus of a fuel tank for a vehicle according to this invention comprises a canister containing an absorbent which absorbs evaporated fuel generated from the fuel tank, a float valve provided in an air chamber of the fuel tank, which float valve is closed when the level of fuel in the fuel tank is equal to or higher than a predetermined level and when the vehicle is inclined or turned over, a fuel outflow preventing valve provided in an upper portion of the air chamber of the fuel tank, which fuel outflow preventing valve is closed when the vehicle is inclined or turned over, a first evaporation passage for communicating the float valve with the canister, a second evaporation passage for communicating the fuel outflow preventing valve with the canister, and opened/closed valve means provided in the second evaporation passage.

A solenoid valve may be used as the opened/closed valve means.

In place of the solenoid valve, a relief valve may be provided.

It is more effective if the relief valve is connected in parallel to the solenoid valve.

During fuel feeding to the fuel tank, the second evaporation passage is shut off by closing operation of the opened/closed valve means. When fuel feeding from a fuel feeding port is continued, the level of fuel in the fuel tank is raised, and when it becomes equal to or higher than a predetermined level, the float valve is closed, and the first evaporation passage is shut off. Consequently, the fuel exceeding the predetermined amount is prevented from flowing in. When fuel feeding from the fuel feeding port is further continued, the fuel level is raised to an upper portion of the fuel feeding port. Then, the fuel-feeding operator becomes aware of the fact that the fuel tank is full, and stops the fuel feeding operation.

When the fuel feeding cap is closed after the fuel feeding, the opened/closed valve means are opened by a switch or an increase of the pressure in the air chamber or the like. Then, the air chamber in the upper portion of the fuel tank communicates with the canister via the second evaporation passage, so that the pressure in the air chamber inside of the fuel tank is maintained at not more than a predetermined value.

Further, when the vehicle travels and the fuel level becomes lower than the predetermined level, the float valve is opened so that the air chamber in the upper portion of the fuel tank also communicates with the canister via the first evaporation passage.

When the vehicle is inclined or turned over, the float valve and the fuel outflow preventing valve are closed so that the fuel in the fuel tank will not flow into the canister.

In the case where a solenoid valve is used as the opened/closed valve means, the solenoid valve is controlled to be opened and closed by a switch interlocking with the fuel feeding cap.

In the case where a relief valve is installed in the second evaporation passage in place of the solenoid valve, it is different from the solenoid valve in that excessive fuel feeding can be prevented without electric operation.

Moreover, in the case where the relief valve is provided in parallel to the solenoid valve, highly reliable operation as a system can be obtained.

DETAILED DESCRIPTION OF THE PREFERRED EMBODIMENTS

Figure 1:
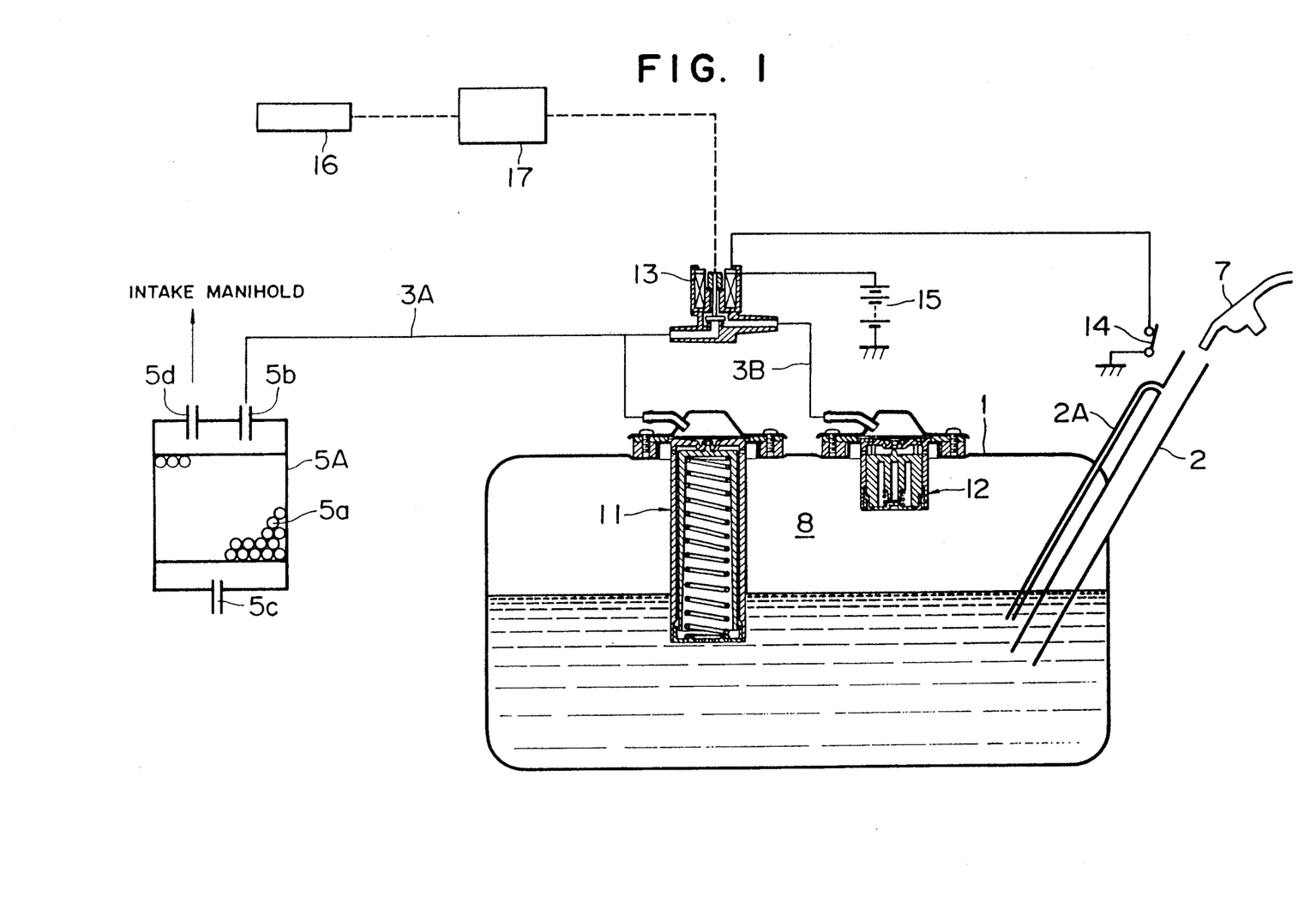
FIG. 1 is a cross-sectional view showing a first embodiment according to the present invention.
Figure 2:
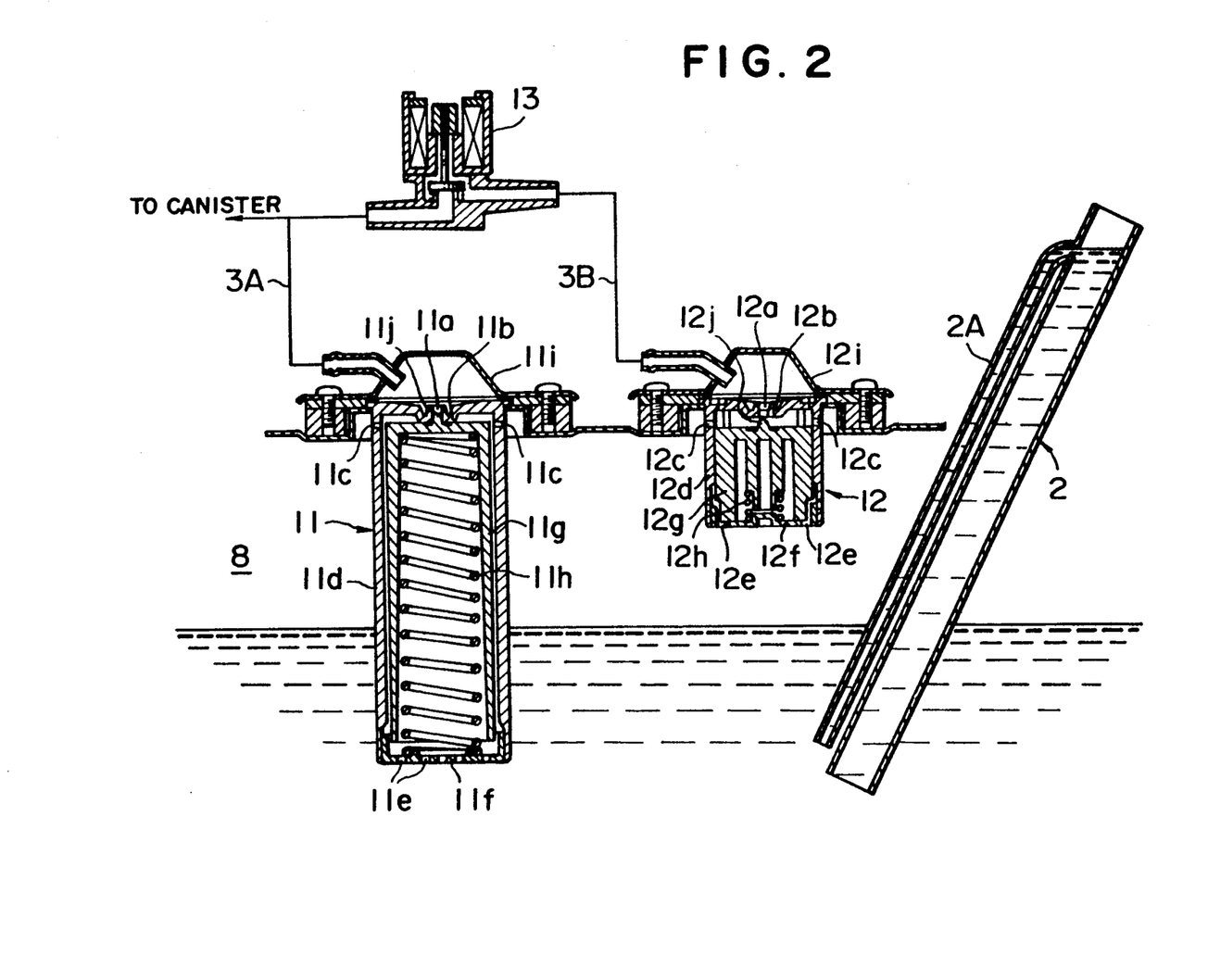
FIG. 2 is an enlarged view of an essential portion of FIG. 1, showing a condition of the level of fuel when a tank is full.

In FIGS. 1 and 2, a first embodiment according to the present invention is illustrated. FIG. 1 shows a fuel tank 1, a filler tube 2, a breather pipe 2A, a first evaporation passage 3A, a second evaporation passage 3B, and a canister 5A which contains absorbents 5a and includes an evaporation port 5b, an atmospheric port 5c, and a purge port 5d connected to an intake manifold (not shown).

FIG. 1 also shows a fuel feeder gun 7, and a float valve 11 provided in an air chamber 8 of the fuel tank 1. The float valve 11 is closed when the level of fuel in the fuel tank 1 is equal to or higher than a predetermined level and when the vehicle is inclined or turned over. As shown in FIG. 2 more specifically, the float valve 11 comprises a cylindrical casing 11d with a ceiling, which includes a valve seat 11b having a hole 11a formed in an upper central portion thereof and vent holes 11c formed in an upper outer-peripheral portion thereof, a bottom plate 11f having holes 11e through which the fuel can flow in and out, a cylindrical float 11g with a ceiling which is provided inside of the casing 11d, a compression spring 11h for urging the float 11g upwardly, and a cover 11i. A valve element 11j which functions in cooperation with the valve seat 11b is projectingly formed on the upper central surface of the ceiling of the float 11g.

The load of the spring 11h is smaller than the weight of the float 11g in the atmosphere. When the fuel level reaches a predetermined value and the float 11g receives the buoyancy, the spring 11h presses the float 11g upwardly, and as shown in FIG. 2, the valve element 11j is brought into contact with the valve seat 11b, thereby closing the hole 11a. The fuel level at that time corresponds to the fuel level when the tank is full. In actual practice, however, it is necessary to make the predetermined level slightly lower than the fuel level when the tank is full, taking compression in the air chamber 8 or such factors into consideration.

The interior of the cover 11i communicates with the first evaporation passage 3A.

A fuel outflow preventing valve 12 is provided in an upper portion of the air chamber 8 of the fuel tank 1, and is closed when the vehicle is inclined or turned over. As shown in FIG. 2 more specifically, the fuel outflow preventing valve 12 comprises a cylindrical casing 12d with a ceiling, which includes a valve seat 12b having a hole 12a formed in an upper central portion thereof and vent holes 12c formed in an upper outer-peripheral portion thereof, a bottom plate 12f having holes 12e through which the fuel can flow in and out, a cylindrical float 12g with a ceiling which is provided inside of the casing 12d, a compression spring 12h for urging the float 12g upwardly, and a cover 12i. A valve element 12j which functions in cooperation with the valve seat 12b is projectingly formed on the upper central surface of the ceiling of the float 12g.

The load of the spring 12h is defined at a value smaller than the weight of the float 12g in the atmosphere and larger than the weight of the float 12g in the fuel. Also, the interior of the cover 12i communicates with the second evaporation passage 3B.

A solenoid valve 13 of a normally open type is provided in the second evaporation passage 3B. As shown in FIG. 1, an excitation coil of the solenoid valve 13 is interlocked with a fuel lid (not shown) of the filler tube 2, and connected to a switch 14 and a battery 15 in series, which switch 14 is turned on when the fuel lid is opened. During fuel feeding, the excitation coil is excited, and the second evaporation passage 3B is shut off. When the fuel lid is closed after fuel feeding is completed, the solenoid valve 13 opens the second evaporation passage 3B.

When a normally open type is employed as the solenoid valve 13, instead of controlling the solenoid valve 13 by use of the switch 14 serving as a sensor to detect opening and closing of the fuel lid in the above-described manner, a vehicle speed sensor 16 for detecting a speed of the vehicle may be used for detecting whether the vehicle is stopped or traveling, and the solenoid valve 13 may be controlled to be opened through a control unit 17 during traveling of the vehicle, as shown in FIG. 1.

Moreover, the float 11g of the float valve 11 and the float 12g of the fuel outflow preventing valve 12 are made of a material which has a specific gravity larger than the specific gravity of the fuel. When the vehicle is inclined or turned over, each of the springs 11h, 12h presses the respective floats 11g, 12g so that the valve elements 11j, 12j abut against the valve seats 11b, 12b, to thereby close the holes 11a, 12a, respectively. In consequence, the first and second evaporation passages 3A, 3B are shut off.

Figure 3:
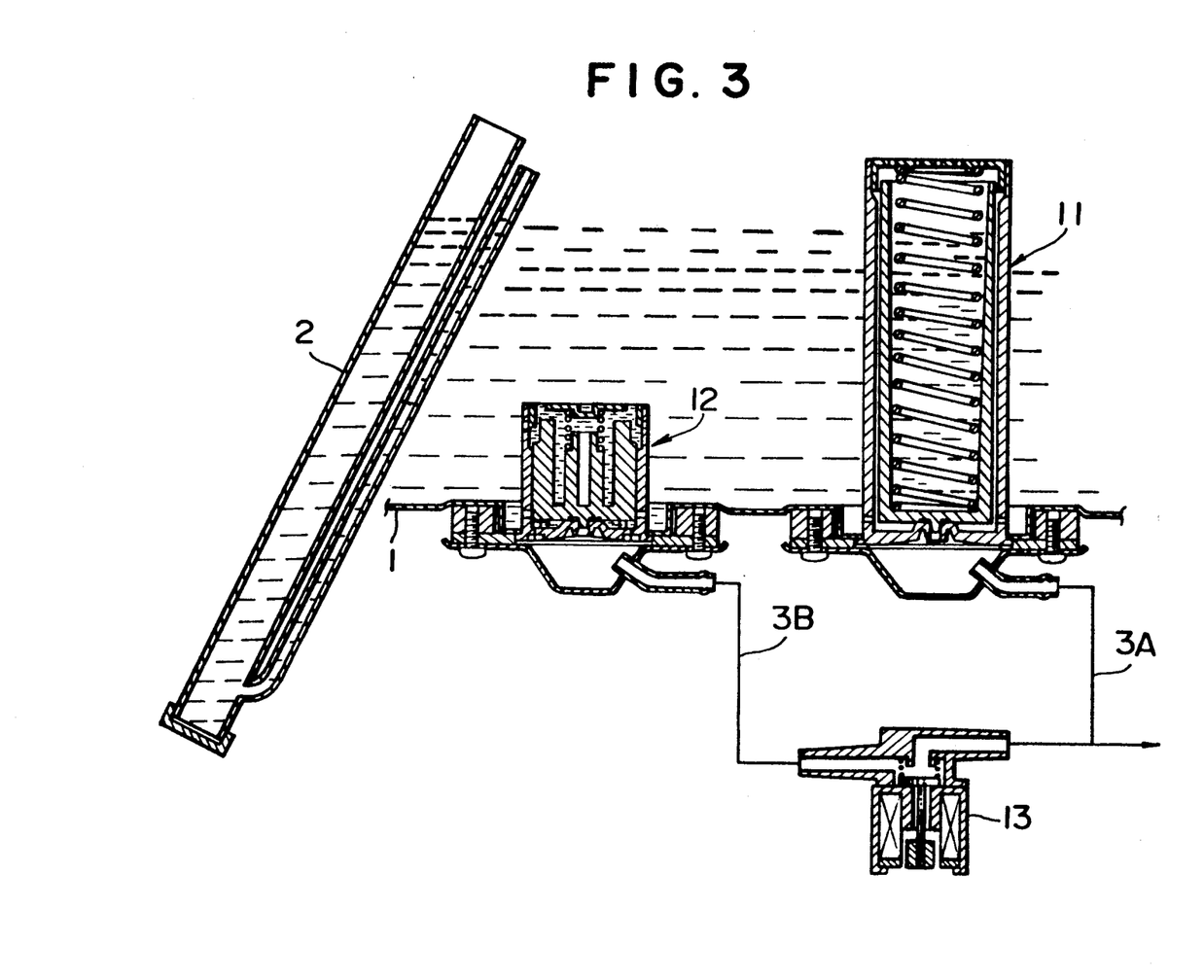
FIG. 3 is an enlarged view of an essential portion of the embodiment shown in FIG. 1 when the vehicle is turned over.

FIG. 3 shows a condition in which, when the vehicle is turned over, both the float valve 11 and the fuel outflow preventing valve 12 are closed and the first and second evaporation passages 3A, 3B are shut off.

FIG. 2 shows a condition in which, when the fuel reaches the full-tank level during fuel feeding, the float valve 11 is closed. In this condition, the solenoid valve 13 is likewise closed.

Figure 4:
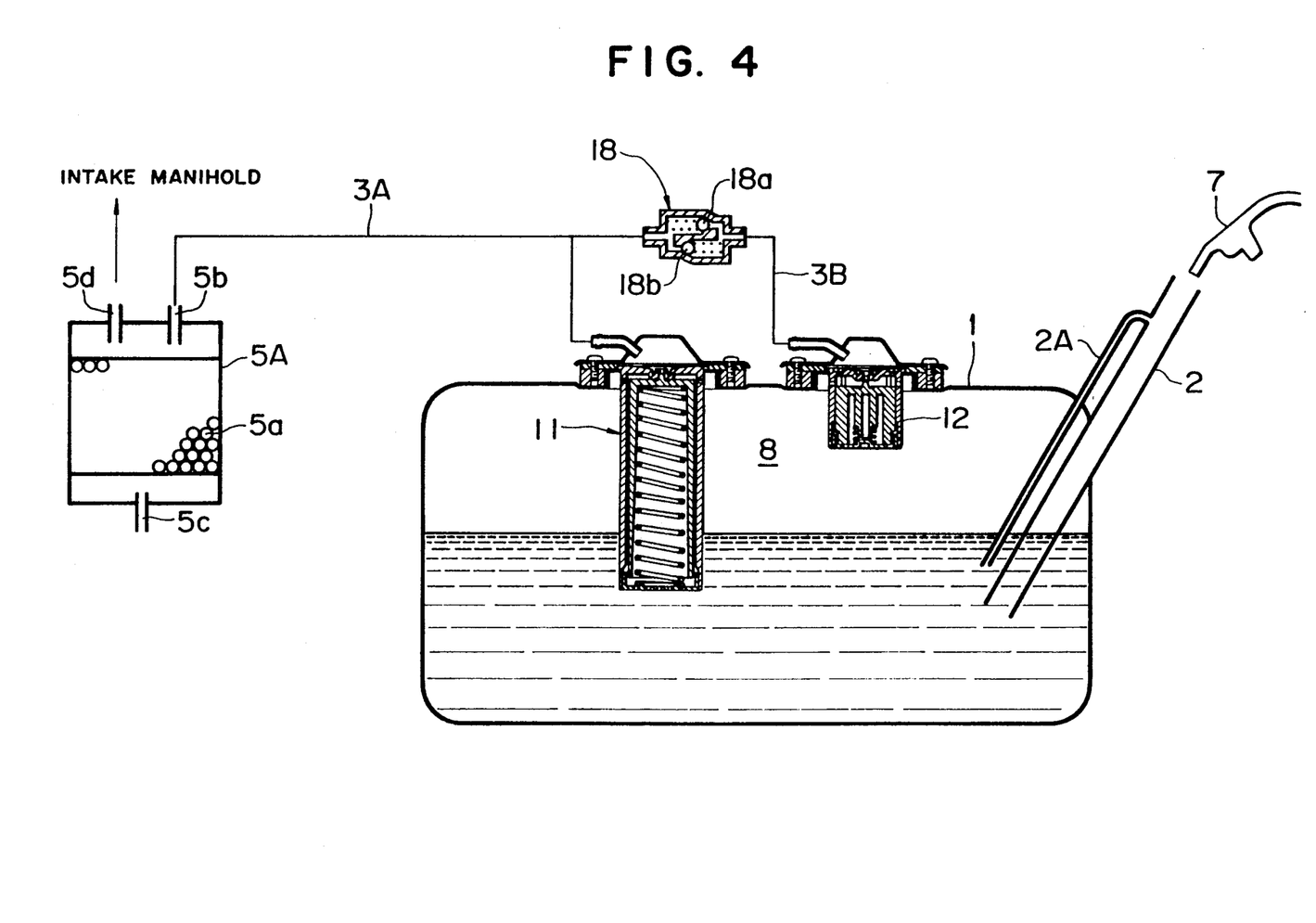
FIG. 4 is a cross-sectional view showing a second embodiment according to the invention.

FIG. 4 illustrates a second embodiment according to the present invention, in which a relief valve means 18 is provided in place of the solenoid valve 13 of the first embodiment. The relief valve means serves as a safety valve means for protecting the fuel tank 1 by preventing its deformation. This is composed of a relief valve 18a for preventing pressurization of the fuel tank 1 over a predetermined extent and a relief valve 18b for preventing pressure reduction below a predetermined extent.

When the level of the fuel in the fuel tank 1 reaches the full-tank position, the float valve 11 is closed to seal the air chamber 8 hermetically. After that, when the level of the fuel in the filler tube 2 moves up to the fuel feeder port, the air chamber 8 has a certain pressure. An operation pressure of the relief valve 18a is defined at a valve slightly larger than the pressure in the air chamber 8 at that time.

In the second embodiment shown in FIG. 4, the relief valve means 18 is closed instead of the solenoid valve 13. Therefore, when the level of the fuel in the fuel tank reaches the full-tank level as a result of fuel feeding, the float valve 11 is also closed to seal the air chamber 8 hermetically, so that the level of the fuel in the fuel tank stops rising, there by preventing excessive fuel feeding.

Figure 5:
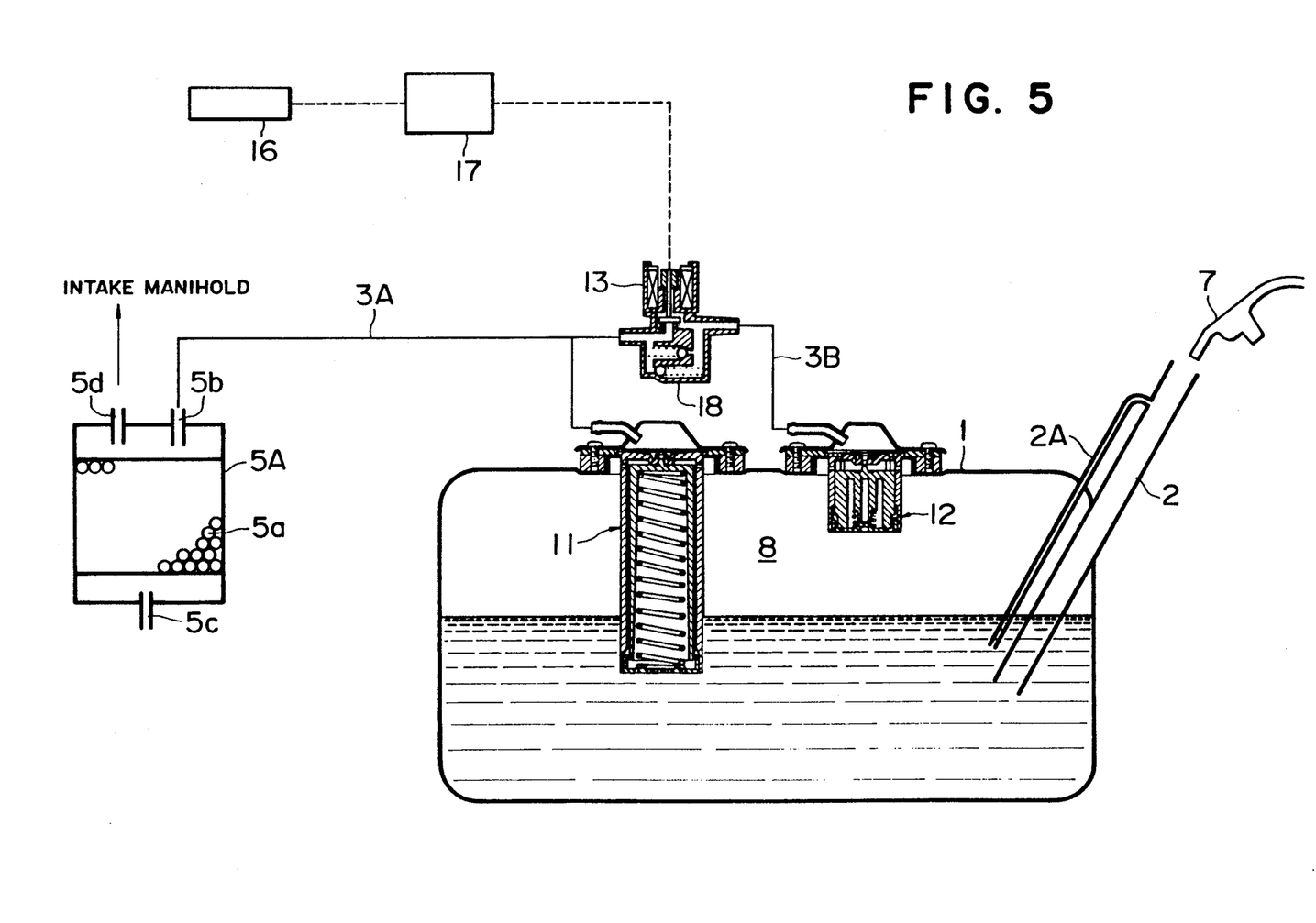
FIG. 5 is a cross-sectional view showing a third embodiment according to the invention.

FIG. 5 illustrates a third embodiment according to the invention, in which the relief valve means 18 is connected in parallel to the solenoid valve 13. Actually, the solenoid valve and the relief valve means have an integral structure. This embodiment is a result of adding the safety of the second embodiment to the first embodiment, and highly reliable operation as a system can be obtained.

Figure 6:
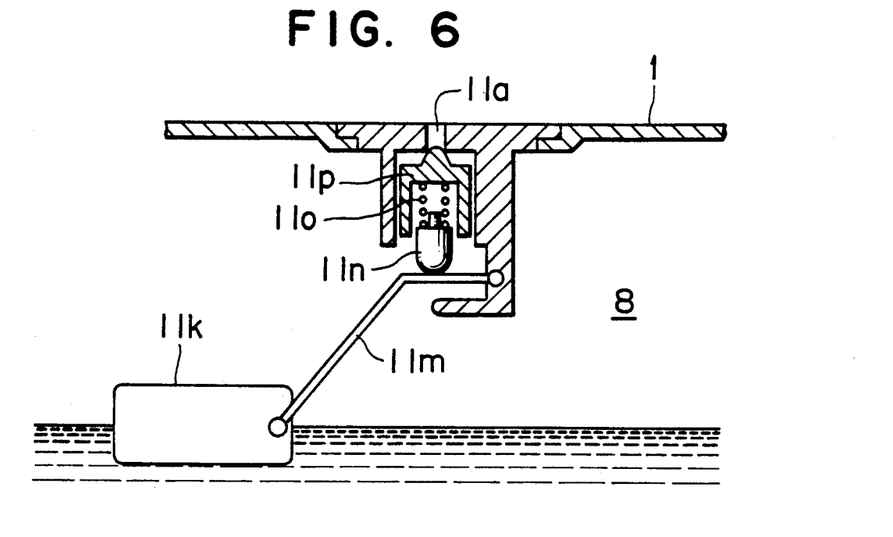
FIG. 6 is a cross-sectional view showing a different example of a float valve used for the embodiments according to the invention.

FIG. 6 shows a different structure of the float valve 11 according to the invention. As shown in the illustration, when the fuel level reaches the full-tank position, a lever 11m to which a float 11k is attached presses a spring shoe 11n upwardly, which lifts a valve 11p through a spring 11o, so as to close a hole 11a, thereby hermetically sealing the air chamber 8.

When the vehicle is inclined or turned over, the spring 11o presses the valve 11p against the hole 11a, to thereby close it.

Figure 7:
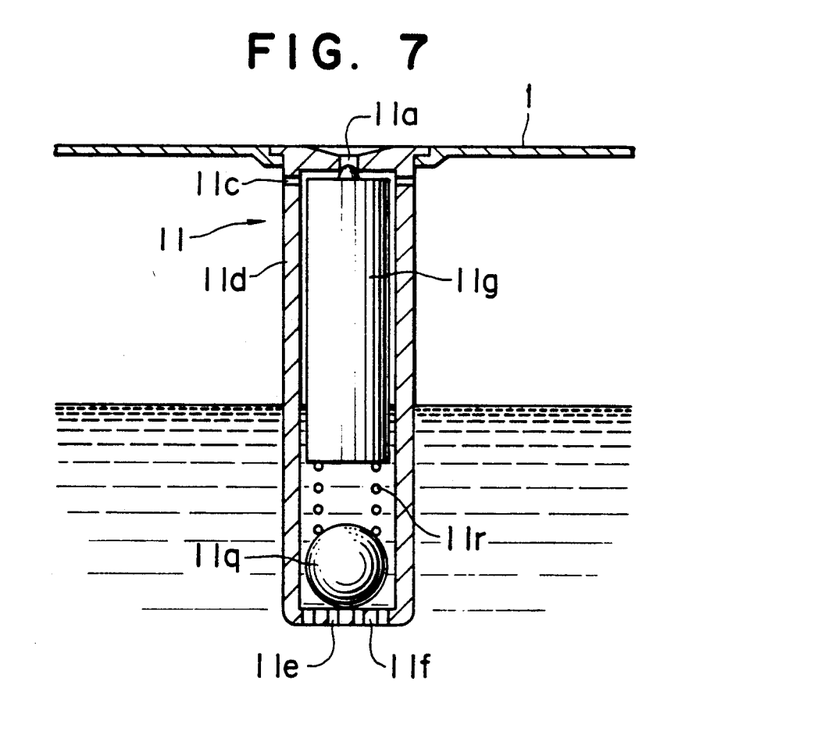
FIG. 7 is a cross-sectional view showing another different example of a float valve of the invention.

FIG. 7 shows another different structure of the float valve 11 according to the invention. A casing 11d includes a hole 11a formed in an upper central portion thereof and vent holes 11c formed in an upper outer-peripheral portion thereof. A float 11g is received in the casing 11d and urged upwardly by a compression spring 11r. Reference numeral 11q denotes a weight whose weight is larger than the buoyancy which the float receives when the whole float 11g sinks in the fuel. The force of the spring 11r which is provided between the float 11g and the weight 11q is defined at a value smaller than the weight of the float 11g. When the fuel level reaches the full-tank position, the float floats due to the buoyancy, to thereby hermetically seal the air chamber 8. When the vehicle is inclined or turned over, the passage (hole) 11a is closed owing to the force of the spring 11r or the weight of the weight 11q.

In the fuel outflow preventing apparatus of the fuel tank according to the present invention, the second evaporation passage is shut off by the solenoid valve or the relief valve means during fuel feeding, and the first evaporation passage is also shut off by closing the float valve when the fuel level reaches the full-tank position, so that the air chamber in the upper portion of the fuel tank is hermetically sealed, thereby preventing excessive fuel feeding over the full-tank level.

When the solenoid valve is opened after the end of fuel feeding or during traveling of the vehicle, the air chamber in the upper portion of the fuel tank communicates with the canister via the second evaporation passage, so that the evaporated fuel generated in the air chamber flows out to the canister, thus maintaining the pressure in the air chamber at not more than a predetermined value.

Moreover, when the vehicle is inclined or turned over, the float valve and the fuel outflow preventing valve are closed to thereby prevent the fuel from flowing into the canister and also from flowing out of the vehicle.

What is claimed is:

1. A fuel outflow preventing apparatus of a fuel tank for a vehicle, comprising a canister containing absorbents which absorb evaporated fuel generated from the fuel tank, a float valve provided in an air chamber of the fuel tank, said float valve closed when the level of fuel in the fuel tank is equal to or higher than a predetermined level and when the vehicle is inclined or turned over, a fuel outflow preventing valve provided in an upper portion of the air chamber of the fuel tank, said fuel outflow preventing valve closed when the vehicle is inclined or turned over, a first evaporation passage for communicating said float valve with the canister, a second evaporation passage for communicating said fuel outflow preventing valve with the canister, and opened/closed valve means provided in said second evaporation passage.

2. A fuel outflow preventing apparatus of a fuel tank for a vehicle according to claim 1, wherein said opened/closed valve means includes a solenoid valve which is controlled to be opened and closed by a switch interlocking with a fuel feeding cap.

3. A fuel outflow preventing apparatus of a fuel tank for a vehicle according to claim 1, wherein said opened/closed valve means includes a relief valve.

4. A fuel outflow preventing apparatus of a fuel tank for a vehicle according to claim 2, wherein said opened/closed valve means further includes a relief valve in parallel to said solenoid valve.

* * * * *